United States Patent
Ryu

(10) Patent No.: US 6,697,852 B1
(45) Date of Patent: Feb. 24, 2004

(54) ONECLICK INSTALLATION FOR CLIENT-SERVER APPLICATION PACKAGE

(76) Inventor: Siung Ryu, 217-510 2danj-Apt, Bangwha3-dong, Kangseo-ku, Seoul (KR)

( * ) Notice: Subject to any disclaimer, the term of this patent is extended or adjusted under 35 U.S.C. 154(b) by 476 days.

(21) Appl. No.: 09/642,549

(22) Filed: Aug. 17, 2000

(51) Int. Cl.[7] ............................................ G06F 15/177
(52) U.S. Cl. ...................... 709/220; 709/227; 709/228; 709/221; 709/203; 717/176; 717/177; 717/178
(58) Field of Search ................................ 709/203, 219, 709/220, 223, 224, 228, 227, 176, 177, 178

(56) References Cited

U.S. PATENT DOCUMENTS 6,282,711 B1 * 8/2001 Halpern et al. ............. 717/175
6,286,038 B1 * 9/2001 Reichmeyer et al. ....... 709/220

* cited by examiner

*Primary Examiner*—Glenton B. Burgess
*Assistant Examiner*—Kevin Parton
(74) *Attorney, Agent, or Firm*—Lee, Hong, Degerman, Kang & Schmadeka

(57) ABSTRACT

A method of installing a client-server application package from a server computer having a server program, a client distribution program, a client installation program and a client program to a client computer. The method comprises installing the server program in the server computer and recognizing a system configuration information of the server computer; and finding a first optimum system configuration information after comparing the system configuration information of the server computer with a standard setting information of the client-server application. This first optimum configuration is then compared with the current configuration of the client to generate a second optimum client configuration to be used for download and installation of the client server application.

14 Claims, 2 Drawing Sheets

ONECLICK INSTALLATION FOR CLIENT-SERVER APPLICATION PACKAGE

CROSS REFERENCE

This application claims the benefit of Korean Patent Application No. 1999-35115, filed on Aug. 24, 1999 and Korean Patent Application No. 2000-17019, filed on Mar. 31, 2000, under 35 U.S.C. §119, the entirety of which is hereby incorporated by reference.

BACKGROUND OF THE INVENTION

1. Field of the Invention

The present invention relates to an oneclick installation method for a client-server application package in a network environment such as an internet and an intranet.

2. Description of Related Art

Typically, in many distributed network environments such as large corporations, computer systems comprises groups of computers that are interconnected via a network, for example a local area network (LAN) and are configured in client-server arrangement. In client-server environment, a client application program should work with a server application program. Such an application sold in the form of a package includes a network based groupware, a messenger for corporation, an on-line test system and the like.

When the client application is installed using a conventional method of installing such applications, a system configuration information such as a setting information, a user information, and an internet protocol (IP) information of the server computer should be input, separately. The system configuration information of the server computer required to install the client application further include a server name, a domain name, an installed protocol, an installed application list, and the like. However, it is very complex and difficult to separately input the optimum system configuration information described above in the client computer. For example, The IP address is generally composed of a total of four fields and each field consists of a number of three figures of 0 to 255. Therefore, when the IP address of the server computer is not correctly input, the client computer has a problem in that the client application does not work properly, whereupon the conventional installation method described above makes it difficult and costly to manage the computer in terms of providing application installation, support and maintenance.

In the mean while, well known is an installation method in which the application manufacture input the IP address of the server computer in the client application in advance, but the method has a problem in that it can not be applied to the server computers having any other IP addresses or any other system configuration information.

For the foregoing reasons, there is a need for the oneclick installation method for the client-server application. The conventional oneclick installation technology uses the method that recognizes an application program interface (API) and an information recorded in a registry to set them in the application, and is imitatively applied to only a standalone program to be installed in an individual computer. In other words, the conventional oneclick installation technology is applied to only a standalone program and thus is not applied to the client-server application package.

SUMMARY OF THE INVENTION

An object of the present invention is to provide an oneclick installation method for a client-server application package in a network environment.

In order to achieve the above object, the preferred embodiment of the present invention provides a method of installing a client-server client application package from a server computer having a server program, a client distribution program, a client installation program and a client program to a client computer, including: installing the server program in the server computer and recognizing a system configuration information of the server computer including a IP address of the server computer, a network protocol information, a server computer name, a DNS information, a gateway information and a setting information; finding a first optimum system configuration information after comparing the system configuration information of the server computer with a standard setting information of the client-server application given by a manufacturer; storing the first optimum system configuration information in the client distribution program; transferring the client distribution program having the first optimum system configuration information via an e-mail from the server computer to the client computer; executing the client distribution program in the client computer and recognizing a system configuration information of the client computer including a list of application programs installed in the client computer and a user information of the client computer; finding a second optimum system configuration information after comparing the first optimum system configuration information with the system configuration information of the client computer and; storing the second optimum system configuration information in the client computer; downloading the client installation program and the client program from the server computer to the client computer; executing the client installation program; and installing the client program in the client computer using the second optimum system configuration.

The first optimum system configuration information is recorded in one of a predetermined room of an execution file of the client distribution program and a certain data file. The second optimum configuration information in one of a .ini file and a registry of an operating system of the client computer.

The preferred embodiment of the present invention also provides a method of installing a client-server client application package from a server computer having a server program, a client distribution program, a client installation program and a client program to a client computer, including: installing the server program in the server computer and recognizing a system configuration information of the server computer including a IP address of the server computer, a network protocol information, a server computer name, a DNS information, a gateway information and a setting information; finding a first optimum system configuration information after comparing the system configuration information of the server computer with a standard setting information of the client-server application given by a manufacturer; storing a part of the first optimum system configuration information including a location or connect information of the server computer in the client distribution program and the rest of the first optimum system configuration information in the server computer; executing the client distribution program in the client computer and recognizing a system configuration information of the client computer including a list of application programs installed in the client computer and a user information of the client computer; connecting the client computer with the server computer using the part of the first optimum system configuration information and conveying the rest of the first optimum system configuration information in the form of a data file from the server computer to the client computer;

finding a second optimum system configuration information after comparing the first optimum system configuration information with the system configuration information of the client computer; storing the second optimum system configuration information in the client computer; downloading the client installation program and the client program from the server computer to the client computer; executing the client installation program; and installing the client program in the client computer using the second optimum system configuration.

The first optimum system configuration information is recorded in one of a predetermined room of an execution file of the client distribution program and a certain data file. The second optimum configuration information in one of a .ini file and a registry of a operating system of the client computer. The rest of the first system configuration is recorded in a certain data file of the server computer. The client distribution program having the part of the first optimum system configuration information is distributed from the server-computer to the client computer.

The preferred embodiment of the present invention further provides a method of installing a client-server client application package from server computer having a server program, a client distribution program, a client installation program and a client program to a client computer, including: installing the server program in the server computer and recognizing a system configuration information of the server computer including a IP address of the server computer, a network protocol information, a server computer name, a DNS information, a gateway information and a setting information; finding a first optimum system configuration information after comparing the system configuration information of the server computer with a standard setting information of the client-server application given by a manufacturer; storing a part of the first optimum system configuration information including a location or connect information of the server computer in the client distribution program and the rest of the first optimum system configuration information in the server computer; conveying the client distribution program having the part of the first optimum system configuration information from the server computer to the client computer together with the client installation program and the client program; executing the client distribution program in the client computer and recognizing a system configuration information of the client computer including a list of application programs installed in the client computer and a user information of the client computer; connecting the client computer with the server computer using the part of the first optimum system configuration information and conveying the rest of the first optimum system configuration information in the form of a data file from the server computer to the client computer; finding a second optimum system configuration information after comparing the first optimum system configuration information with the system configuration information of the client computer and; storing the second optimum system configuration information in the client computer; downloading the client installation program and the client program from the server computer to the client computer; executing the client, installation program; and installing the client program in the client computer using the second optimum system configuration.

The client distribution program having the part of the first optimum system configuration program, the client installation program and the client program are packed into one package. The client distribution program having the part of the first optimum system configuration program, the client installation program and the client program are conveyed via an e-mail. The client distribution program having the part of the first optimum system configuration program, the client installation program and the client program are conveyed in the form of a floppy diskette.

Using the oneclick method for the client-server application package according to the preferred embodiment of the present invention, the following advantages can be obtained. First, it is simple and easy to install the client program in the client computer. Secondly, an installation time and cost are reduced. Thirdly, inquiries from the clients due to the client program installation problem become less. Fourthly, oneclick installation for a client-server application package is possible.

BRIEF DESCRIPTION OF THE DRAWINGS

For a more complete understanding of the present invention and the advantages thereof, reference is now made to the following descriptions taken in conjunction with the accompanying drawings, and in which.

DETAILED DESCRIPTION OF PREFERRED EMBODIMENTS

Reference will now be made in detail to the preferred embodiment of the present invention, example of which is illustrated in the accompanying drawings.

Figure 1:
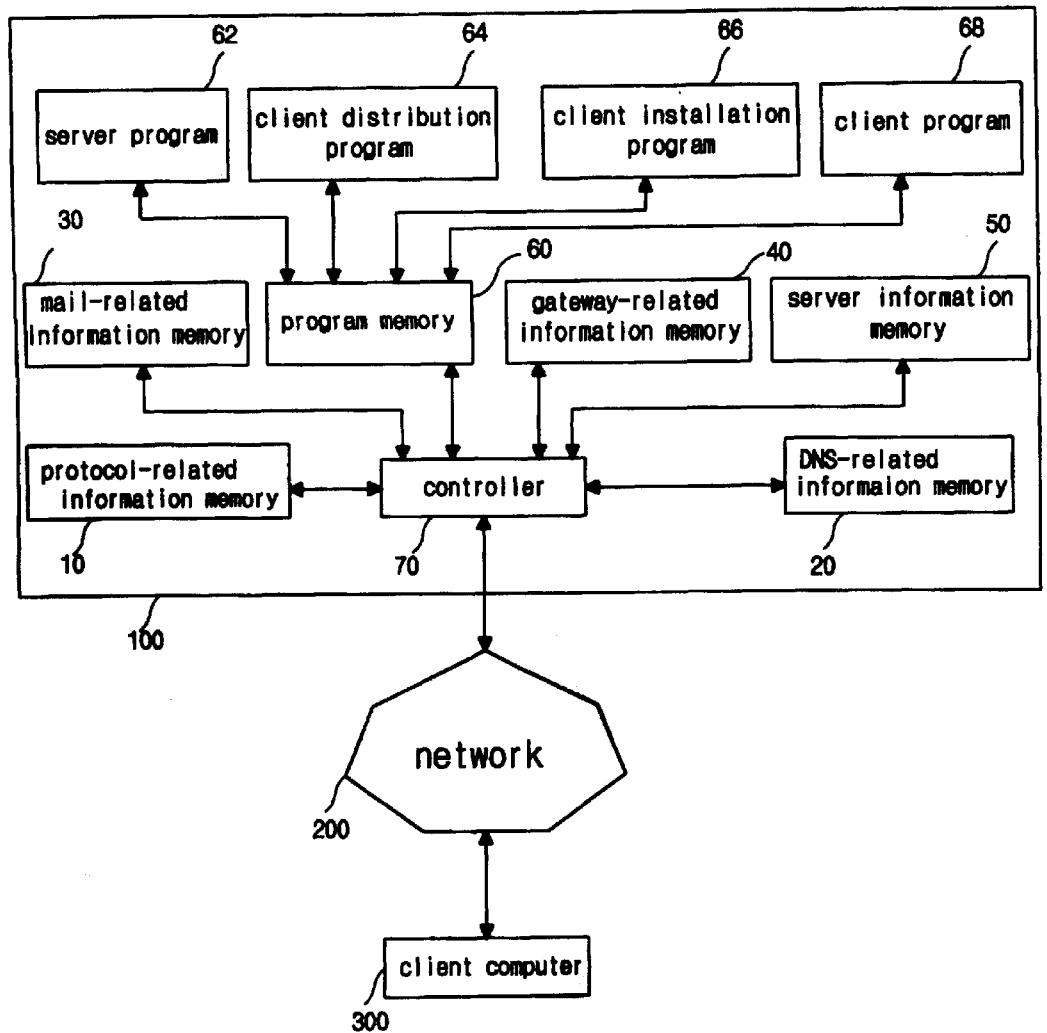
FIG. 1 is a block diagram illustrating an oneclick installation method for a client-sever application package according to a preferred embodiment of the present invention.

An oneclick installation system for a client-server application package according to a preferred embodiment of the present invention, as shown in FIG. 1, comprises a server computer 100, a network 200 such as an internet and an intranet, and a client computer 300. The server computer 100 has a protocol-related information memory 10 storing a protocol-related information, a DNS-related information memory 20 storing a domain name and an IP address, a mail-related information memory 30 storing an e-mail address of the server computer and the client, a gateway-related information memory 40 storing a gateway address, server information memory 50 storing a server computer's name and the like, a program memory 60, and a controller 70 controlling all components of the server computer 100 described above.

Further, the program memory 60 of the server computer 100 has a server program 62, a client distribution program 64, a client installation program 66, and a client program 68.

Certain terminology used in the preferred embodiment of the present invention needs to be explained. First, the server program 62 serves to recognize a system configuration: information of the server computer 100 such as a network environment information of the server computer 100, a server computer information, an information of applications installed in advance in the server computer 100. The server program 62 further serves to store a first optimum system configuration information in a certain file or a predetermined room of the client distribution program 64 or a certain file of the server computer 100 after comparing the system configuration information of the server computer 100 with a standard setting information given by the company that develops the client-server application.

The client distribution program 64 serves to download the client installation program 66 and execute it. The client distribution program 64 further serves to recognize a system configuration information of the client computer 300 to record a second optimum system configuration information in its certain file or a certain registry of the operating system of the client computer 300 after comparing the system configuration information of the client computer 300 with the first optimum system configuration information that is recorded in the client distribution program 64.

The client installation program 66 serves to store various environment information and produce required files for a normal operation of the client program 68.

The client program 68 is used to refer to a program finally produced in the client computer 300 after all installation processes.

At this time, the client installation program 66 may include the client program 68.

In the mean while, the client distribution program 64 having the first optimum system configuration information can be supplied to the client via a network for example e-mail attaching the client distribution program 64 or in the form of a floppy diskette having the client distribution program 64, and the like. In other words, only the client distribution program 64 having the first optimum system configuration, information can be supplied to the client, separated from the client installation program 66 and the client program 68. At this time, when the client or end user executes the client distribution program 64 having the first optimum system configuration information, the distribution program 64 recognizes the system configuration information of the client computer 300 to record the second optimum system configuration information in its certain file or a certain registry of the operating system of the client computer 300 after comparing the system configuration information of the client computer 300 with the first optimum system configuration information that is recorded in the client distribution program 64. Then, the client computer 300 gets to connect the server computer 100 using a location or connect information of the server computer 100 that is a portion of the first optimum system configuration information. The client distribution program 64 downloads the client installation program 66 into the client computer 300, and then the client installation program 66 is executed, thereby installing the client program 68 in the client computer 300. At this point, in order to reduce the data capacity of the supplied client distribution program 64, the supplied client distribution program 64 may have a portion of the first optimum system configuration information, for example a location or connect information of the server computer 100. In other words, when the client executes the client distribution program 64 having only the location or connect information of the server computer 100, the client computer 300 can connect the server computer 100. Then the rest of the first optimum system configuration information stored in the certain file of the server computer 100 is conveyed to the client computer 300 in the form of a certain file.

Further, in case of the slow transferring rate of a network, it is preferred that the client distribution program 64 having the first optimum system configuration information, the client installation program 66, and the client program 68 are packed into one package. Therefore, a program installation time can be reduced. When the package is preferably distributed via a transfer means such as an email or in the form of a floppy diskette and then is executed so that the client installation program 66 is executed, thereby installing the client program 68 in the client computer 300.

Figure 2:
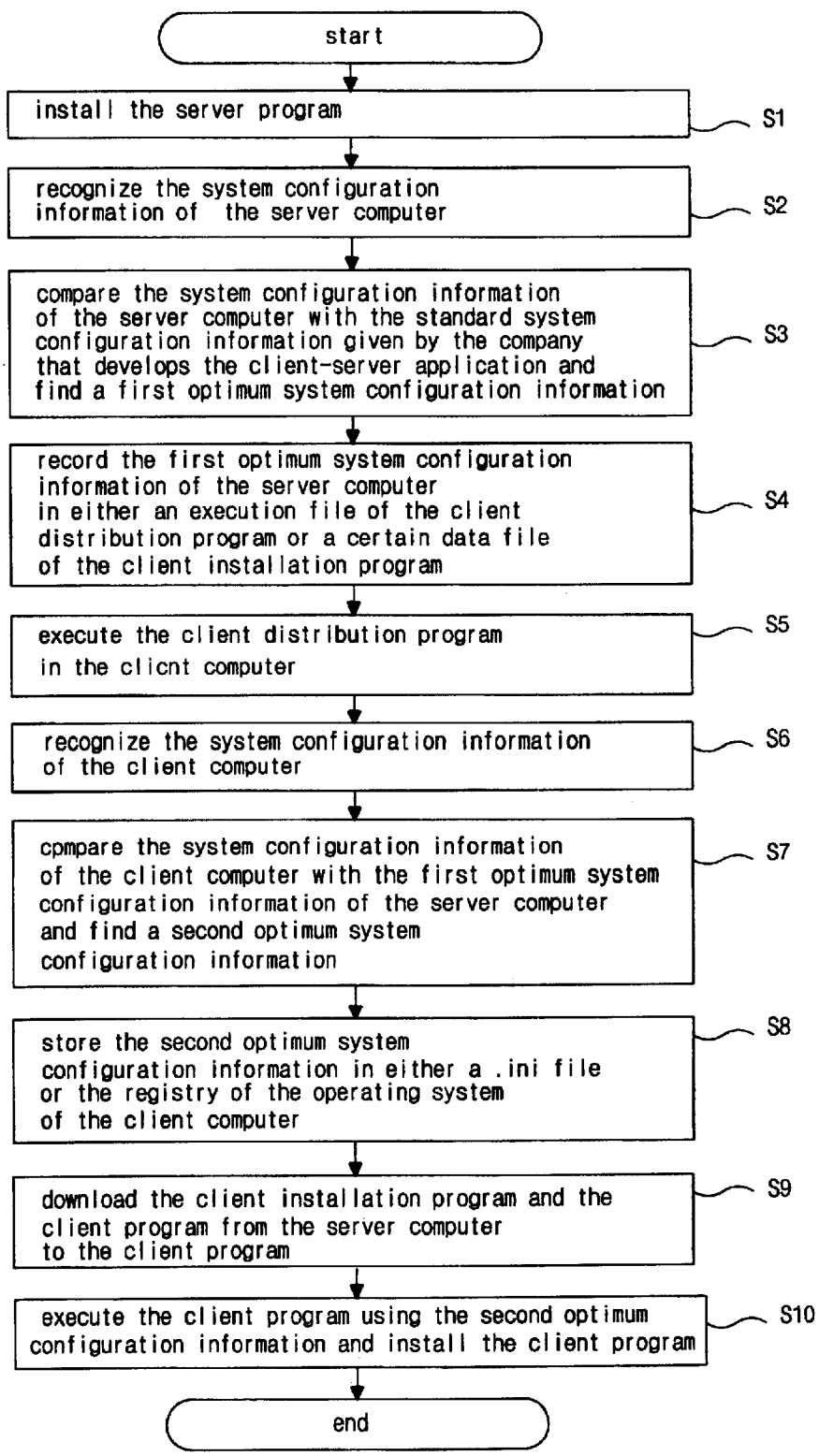
FIG. 2 is a flow chart illustrating the oneclick installation method for the client-sever application package according to the preferred embodiment of the present invention.

The oneclick installation method for the client-sever application package according to the preferred embodiment of the present invention will be explained hereinafter in more detail with reference to a flow chart of FIG. 2.

When the server program 62 is installed in the server computer 100 (step S1), the server program 62 recognizes the system configuration information of the server computer 100: an IP address information; a server name; a DNS information; a registry-related information; and a setting information of the server computer 100 (step S2). At this time, in order to recognize the system configuration information of the server computer 100, a technique of parsing a .ini file and a data file of a certain application is preferably used. Such a system configuration information of the server computer 100 includes a) a TCP/IP address, b) a network protocol information, c) a computer's name, d) a DNS (domain name server) information, e) a gateway information, and f) installed applications, theirs setting information and the like. Such a system configuration information of the server computer 100 is variable according to a configuration of the server computer 100. A method of recognizing the system configuration information of the server computer 100 described above is as follows.

1) A method of recognizing the TCP/IP address: A windows NT provides a API capable of recognizing the TCP/IP address such as GetHostAdd and, therefore the TCP/IP address can be recognized through the GetHostAdd. Today, the TCP/IP address type as a protocol is mainly used.

2) A method of recognizing what kind of protocol is installed in the server computer: The protocol information is stored in the registry called "HKEY_LOCAL_MACHINE\System\CurrentControlSet\Services\Class\NetTrans". Therefore, the protocol information can be recognized using a RegLoadKey that is one of the window APIs (key values of the RegLoadKey depend on a company that develops an application).

3) A method of recognizing the name of the server-computer: This information is recognized by either a GetHostName that is one of the window APIs or by a RegLoadKey which is stored in the registry called "HKEY_LOCAL_MACHINE\System\CurrentControlSet\Control\ComputerName\Com puterName".

4) A method of recognizing the DNS information: The DNS information is stored in the registry called "HKEY_LOCAL_MACHINE\System\CurrentControlSet\Services\VxD\MSTCP". Therefore, the DNS information can be recognized using a RegLoadKey that is one of the window APIs.

5) A method of recognizing the gateway information: The gateway information is stored in the registry called "HKEY_LOCAL_MACHINE\System\CurrentControlSet\Services\Class\NetTrans". The gateway information can be recognized using a RegLoadKey that is one of the window APIs.

6) A method of recognizing the installed applications and theirs setting information: When all programs are installed in the server computer, the setting information and a list of the installed applications are recorded in the registry called "HKEY_CURRENT_USERSoftware" or "HKEY_LOCAL_MACHINE\Software\Microsoft\Windows\CurrentVersion\Uninstall". Such information includes a database computer program. Since most of the information required in a database client program exists in this registry, the database client program is installed easily and correctly. Therefore, these informations can be recognized using a RegLoadKey that is one of the window APIs.

Further, the server program 62 servers to select or find the first optimum system configuration information by comparing the standard system configuration information given by the company that develops the client-server application with the recognized system configuration information of the server computer 100 (step S3). It is preferred that part or all of the first optimum system configuration information of the server computer 100 is recorded in either a predetermined room of an execution file of the client distribution program 64 or a certain data file when the client distribution program 64 is packed into one package together with the client installation program 66 and the client program 68 (step S4). Most of the first optimum system configuration information may be stored in a certain data file of the server computer 100. As a result, the client distribution program 64 preferably gets to have the system configuration information of the server computer 100. Therefore, when the client distribution program 64 is executed (step S5), the client distribution program 64 recognizes the system configuration information of the client computer 300 (step S6) and find the second optimum system configuration information after comparing the first optimum system configuration information with the system configuration information of the client computer 300 (step S7). Sequentially, the client distribution program 64 records the second optimum system configuration information in either a .ini file or the registry of the operating system of the client computer 300 (step S8). At the same time as a recordation of the second optimum system configuration information, the client installation program 66 and the client program 68 are conveyed from the server computer 100 to the client computer 200 (step S9). However, the step S9 may be omitted in case that the client distribution program 64 is supplied to the client in the form of one package together with the client installation program 66 and the client program 68. Finally, the client distribution program 64 executes the client installation program 66, whereby the client program 68 is installed in the client computer 300 using the second optimum system configuration information in the client computer 300 (step S10). At this point, the client can confirm whether or not the finally selected system configuration information, i.e., the second optimum system configuration information is recorded correctly through the client installation program 66 during installing the client program 68. Also, the client amends the incorrect second optimum system configuration information during the installing the client program 68.

The system configuration information of the client computer 300 includes a) an application program list installed in the client computer, b) a user information of the client computer 300 and the like. Such a system configuration information of the client computer 300 is variable according to a configuration of the client computer 300. A method of recognizing the system configuration information of the client computer 300 described above is as follows.

1) A method of recognizing the list of the applications installed in the client computer 300: When a program is installed in the client computer 300, the setting information and all lists of installed applications are recorded in the registry called "HKEY_CURRENT_USERWSoftware". Such information includes a database computer program. Since most of information that a database client program requires exist in this registry, the database client program is installed easily and correctly. Therefore, these information can be recognized using a RegLoadKey that is a window API.

2) A method of recognizing the user information of the client computer 300: Software programs such as a word, an excel, an email client, and a web browser have the user information and the network information recorded in the registry called "HKEY_CURRNET_USERsoftware" when installed. Therefore, the user information can be recognized by parsing a list of companies that manufactures the applications and a data file of the applications.

3) A method of recognizing a user e-mail information: This information is stored in the registry "HKEY_CURRENT_USER\SOFTWARE\Microsoft\Internet Account Manager"

Besides, an automatically recorded system configuration information is as follows: a server name; a server IP address; a domain address of the server computer; a name of the client computer, a user information; a company information of an user; a user ID; a network gateway address; a DNS address; a server email information; a proxy server address and a port number of a network and the like.

As a result, it is simple and easy to install the client program 68 because the client needs not to separately input the system configuration information of the server computer and the client computer such as the server computer information, the client computer information and the user information.

In the mean while, as described above, a part of the system configuration information of the server computer 100, which includes a location or connect information of the server computer, may be stored in the client distribution program if the client distribution program 64 is short of space to write the system configuration information. Therefore, a transfer mode can be employed: the location or connect information of the server computer is stored in the client distribution program 64 and the client computer the client distribution program 64 having the location or connect information of the server computer is transferred to the client computer, and then the rest is transferred via a network communication with the server program 62 when the client distribution program 64 connects the server computer 100.

The transfer mode described above is one in which the client distribution program 64 connect the sever computer 100 using the location or connect information of the server computer to receive the rest system configuration information of the server computer 100. However, when the server computer is to database information of the various client computers such as a operating system, a computer name, an user name and the like, it is possible that the system configuration information of the client computer 300 is alternatively transferred to the server computer 100 during installation of the client program 68 to grasp the client information.

As described herein before, using the oneclick installation method for the client-server application package according to the preferred embodiment of the present invention, the following advantages can be obtained. First, it is simple and easy to install the client program in the client computer. Secondly, an installation time and cost are reduced. Thirdly, inquiries from the clients due to the client program installation problem become less. Fourthly, oneclick installation for a client-server application package is possible.

While the invention has been particularly shown and described with reference to preferred embodiments thereof, it will be understood by those skilled in the art that the foregoing and other changes in form and details may be made therein without departing from the spirit and scope of the invention. For example, the preferred embodiment of the present invention is explained centering on a window-based operating system, but the preferred embodiment of the present invention can be applied to any other operating system. Further, the preferred embodiment of the present invention can be applied to all network environments having a client-server environment using a cable or a wireless communication and an intranet as well as an internet.

What is claimed is:

1. A method of installing a client-server client application package from a server computer having a server program, a client distribution program, a client installation program and a client program to a client computer, comprising:

installing the server program in the server computer and recognizing a system configuration information of the server computer including a IP address of the server computer, a network protocol information, a server computer name, a DNS information, a gateway information and a setting information;

finding a first optimum system configuration information after comparing the system configuration information of the server computer with a standard setting information of the client-server application given by a manufacturer;

storing the first optimum system configuration information in the client distribution program;

executing the client distribution program in the client computer and recognizing a system configuration information of the client computer including a list of application programs installed in the client computer and a user information of the client computer;

finding a second optimum system configuration information after comparing the first optimum system configuration information with the system configuration information of the client computer and;

storing the second optimum system configuration information in the client computer;

downloading the client installation program and the client program from the server computer to the client computer;

executing the client installation program; and installing the client program in the client computer using the second optimum system configuration.

2. The method of claim 1, wherein the first optimum system configuration information is recorded in one of a predetermined room of an execution file of the client distribution program and a certain data file.

3. The method of claim 2, wherein the second optimum configuration information in one of a .ini file and a registry of a operating system of the client computer.

4. The method of claim 1, further comprising, distributing the client distribution program having the first optimum system configuration information from the server computer to the client computer.

5. A method of installing a client-server client application package from a server computer having a server program, a client distribution program, a client installation program and a client program to a client computer, comprising:

installing the server program in the server computer and recognizing a system configuration information of the server computer including a IP address of the server computer, a network protocol information, a server computer name, a DNS information, a gateway information and a setting information;

finding a first optimum system configuration information after comparing the system configuration information of the server computer with a standard setting information of the client-server application given by a manufacturer;

storing a part of the first optimum system configuration information including a location or connect information of the server computer in the client distribution program and the rest of the first optimum system configuration information in the server computer;

executing the client distribution program in the client computer and recognizing a system configuration information of the client computer including a list of application programs installed in the client computer and a user information of the client computer;

connecting the client computer with the server computer using the part of the first optimum system configuration information and conveying the rest of the first optimum system configuration information in the form of a data file from the server computer to the client computer;

finding a second optimum system configuration information after comparing the first optimum system configuration information with the system configuration information of the client computer;

storing the second optimum system configuration information in the client computer;

downloading the client installation program and the client program from the server computer to the client computer;

executing the client installation program; and installing the client program in the client computer using the second optimum system configuration.

6. The method of claim 5, wherein the first optimum system configuration information is recorded in one of a predetermined room of an execution file of the client distribution program and a certain data file.

7. The method of claim 6, wherein the second optimum configuration information in one of a .ini file and a registry of a operating system of the client computer.

8. The method of claim 6, wherein the rest of the first system configuration is recorded in a certain data file of the server computer.

9. The method of claim 6, further comprising, distributing the client distribution program having the part of the first optimum system configuration information from the server computer to the client computer.

10. The method of claim 6, further comprising, conveying the second system configuration information of the client computer to the server computer while storing the second optimum system configuration information in the client computer.

11. A method of installing a client-server client application package from a server computer having a server program, a client distribution program, a client installation program and a client program to a client computer, comprising:

installing the server program in the server computer and recognizing a system configuration information of the server computer including a IP address of the server computer, a network protocol information, a server computer name, a DNS information, a gateway information and a setting information;

finding a first optimum system configuration information after comparing the system configuration information of the server computer with a standard setting information of the client-server application given by a manufacturer;

storing a part of the first optimum system configuration information including a location or connect information of the server computer in the client distribution program and the rest of the first optimum system configuration information in the server computer;

conveying the client distribution program having the part of the first optimum system configuration information from the server computer to the client computer together with the client installation program and the client program;

executing the client distribution program in the client computer and recognizing a system configuration information of the client computer including a list of application programs installed in the client computer and a user information of the client computer;

connecting the client computer with the server computer using the part of the first optimum system configuration information and conveying the rest of the first optimum system configuration information in the form of a data file from the server computer to the client computer;

finding a second optimum system configuration information after comparing the first optimum system configuration information with the system configuration information of the client computer and;

storing the second optimum system configuration information in the client computer;

downloading the client installation program and the client program from the server computer to the client computer;

executing the client installation program; and installing the client program in the client computer using the second optimum system configuration.

12. The method of claim 11, wherein the client distribution program having the part of the first optimum system configuration program, the client installation program and the client program are packed into one package.

13. The method of claim 12, wherein the client distribution program having the part of the first optimum system configuration program, the client installation program and the client program are conveyed via an e-mail.

14. The method of claim 12, wherein the client distribution program having the part of the first optimum system configuration program, the client installation program and the client program are conveyed in the form of a floppy diskette.

* * * * *